(12) United States Patent
Roh et al.

(10) Patent No.: US 9,628,725 B2
(45) Date of Patent: Apr. 18, 2017

(54) PIXEL ARRAY INCLUDING PIXEL GROUPS OF LONG AND SHORT EXPOSURE PIXELS AND IMAGE SENSOR INCLUDING SAME

(71) Applicant: SAMSUNG ELECTRONICS CO., LTD., Suwon-si (KR)

(72) Inventors: Young-hun Roh, Suwon-si (KR); Min-kyu Kim, Hwaseong-si (KR); Hye-mi Park, Yongin-si (KR); Ji-yeon Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 14/553,434

(22) Filed: Nov. 25, 2014

(65) Prior Publication Data

US 2015/0146067 A1 May 28, 2015

(30) Foreign Application Priority Data

Nov. 25, 2013 (KR) .......................... 10-2013-0143922

(51) Int. Cl.
*H04N 5/345* (2011.01)
*H04N 5/369* (2011.01)
*H04N 5/355* (2011.01)
*H04N 5/347* (2011.01)
*H04N 9/04* (2006.01)

(52) U.S. Cl.
CPC ............. *H04N 5/345* (2013.01); *H04N 5/347* (2013.01); *H04N 5/35554* (2013.01); *H04N 5/3696* (2013.01); *H04N 9/045* (2013.01); *H04N 2209/046* (2013.01)

(58) Field of Classification Search
CPC ...... H04N 5/345; H04N 5/347; H04N 5/3535; H04N 5/35554; H04N 5/35563; H04N 5/35581; H04N 5/3696; H04N 9/045; H04N 2209/046
See application file for complete search history.

(56) References Cited

U.S. PATENT DOCUMENTS

| 6,714,243 | B1 | 3/2004 | Mathur et al. |
| 7,791,665 | B2 | 9/2010 | Kawai |
| 7,825,969 | B2 | 11/2010 | Tico et al. |
| 7,839,437 | B2 | 11/2010 | Kasai et al. |

(Continued)

FOREIGN PATENT DOCUMENTS

| JP | 2012-074763 A | 4/2012 |
| KR | 10-2011-0062981 A | 6/2011 |

*Primary Examiner* — Dennis Hogue
(74) *Attorney, Agent, or Firm* — Sughrue Mion, PLLC

(57) ABSTRACT

A pixel array to which a high dynamic range and a white pixel are applied, and an image sensor including the same are provided. The pixel array of the image sensor includes: a plurality of pixel groups, each pixel group including one or more long exposure pixels and one or more short exposure pixels, wherein each pixel group includes a first pixel, among the one or more long exposure pixels and the one or more short exposure pixels, having a white component and second to fourth pixels, among the one or more long exposure pixels and the one or more short exposure pixels, having first to third color components, the first pixel belonging to a first pixel group is a long exposure pixel, and the first pixel belonging to a second pixel group that is adjacent to the first pixel group is a short exposure pixel.

18 Claims, 12 Drawing Sheets

(56) References Cited

U.S. PATENT DOCUMENTS

| | | |
|---|---|---|
| 7,847,857 B2 | 12/2010 | Saito et al. |
| 7,978,240 B2 | 7/2011 | Kido et al. |
| 8,054,342 B2 | 11/2011 | Wada |
| 8,059,174 B2 | 11/2011 | Mann et al. |
| 8,150,201 B2 | 4/2012 | Kasai et al. |
| 2007/0013798 A1* | 1/2007 | Ahn ............... H04N 5/335 348/308 |
| 2009/0091645 A1* | 4/2009 | Trimeche ......... H04N 5/235 348/273 |
| 2011/0169980 A1 | 7/2011 | Cho et al. |
| 2011/0285881 A1* | 11/2011 | Izuha ............. H04N 5/2254 348/279 |
| 2012/0218426 A1* | 8/2012 | Kaizu ............ H04N 5/35554 348/208.4 |
| 2012/0287294 A1 | 11/2012 | Kaizu et al. |
| 2012/0307133 A1* | 12/2012 | Gao ............. G02B 27/0075 348/349 |
| 2013/0193311 A1 | 8/2013 | Yoshida |
| 2014/0027613 A1* | 1/2014 | Smith ............ H04N 5/2352 250/208.1 |

* cited by examiner

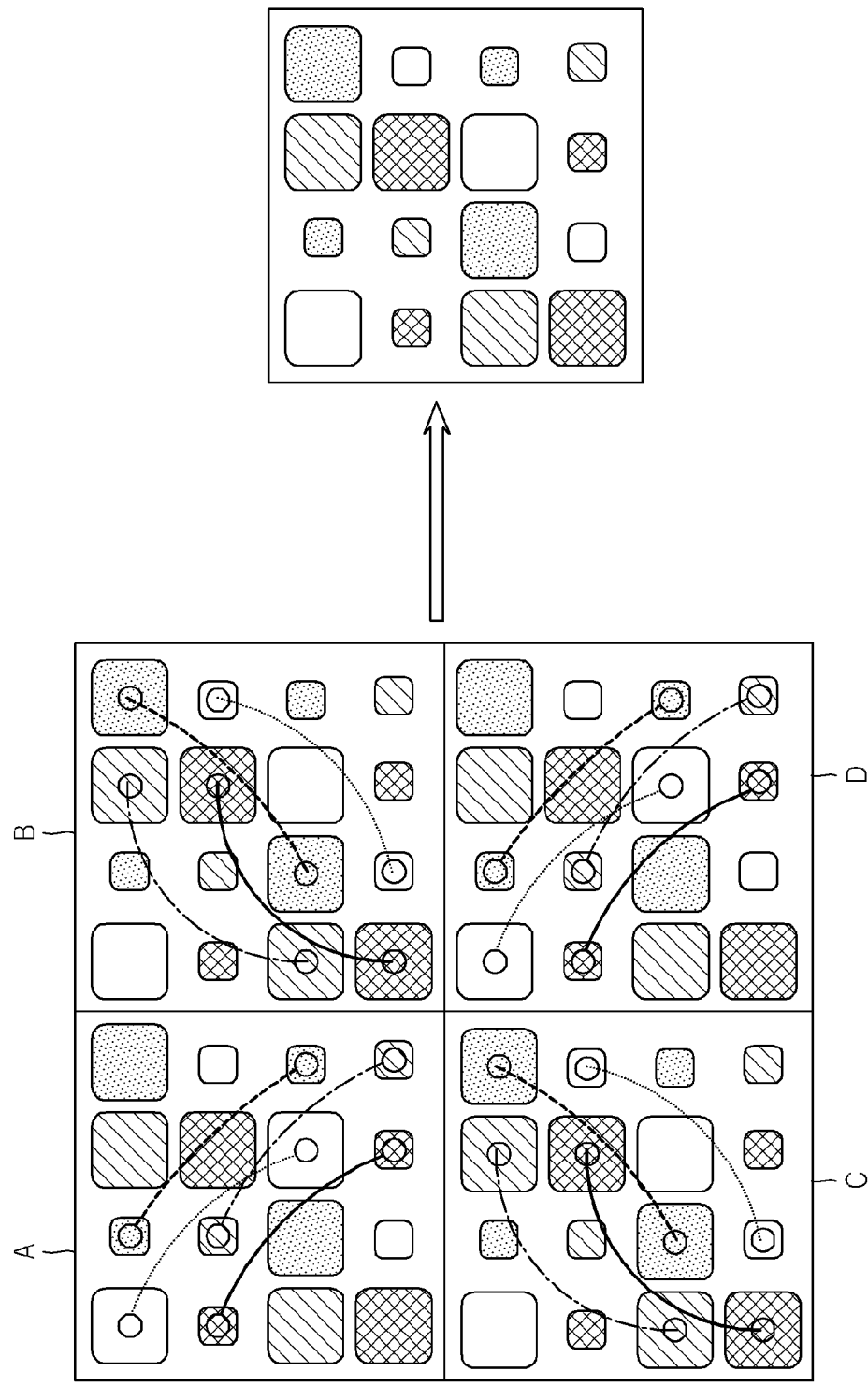

PIXEL ARRAY INCLUDING PIXEL GROUPS OF LONG AND SHORT EXPOSURE PIXELS AND IMAGE SENSOR INCLUDING SAME

CROSS-REFERENCE TO RELATED APPLICATION

This application claims priority from Korean Patent Application No. 10-2013-0143922, filed on Nov. 25, 2013 in the Korean Intellectual Property Office, the disclosure of which is incorporated herein in its entirety by reference.

BACKGROUND

Apparatuses and methods consistent with exemplary embodiments relate to a pixel array of an image sensor, and more particularly, to a pixel array to which a high dynamic range and a white pixel are applied, and an image sensor including the same.

An image sensor for capturing an image and converting the captured image into an electrical signal is used for not only electronic devices for general customers, such as digital cameras, mobile phone cameras, and portable camcorders, but also cameras equipped in vehicles, security devices, robots, etc. The image sensor includes a pixel array, and each pixel included in the pixel array may include a light detection element. The light detection element may generate an electrical signal according to the intensity of absorbed light.

As an example of the image sensor, a complementary metal-oxide semiconductor (CMOS) image sensor has a pixel of which a size is continuously reduced in the related art. The reduction in the size of a pixel may cause deterioration in the performance thereof, and thus, a method for overcoming the performance deterioration is demanded. As another issue, a high dynamic range may be demanded to generate a fine image on either a dark screen or a bright screen, which is difficult to realize while maintaining resolution.

SUMMARY

Aspects of one or more exemplary embodiments provide a pixel array capable of improving sensing sensitivity with a high dynamic range, and an image sensor including the same.

According to an aspect of an exemplary embodiment, there is provided a pixel array of an image sensor, the pixel array including: a plurality of pixel groups, each pixel group including one or more long exposure pixels and one or more short exposure pixels, wherein each pixel group includes, from among the one or more long exposure pixels and the one or more short exposure pixels, a first pixel having a white component and second to fourth pixels having first to third color components, the first pixel belonging to a first pixel group, among the plurality of pixel groups, is a long exposure pixel, and the first pixel belonging to a second pixel group that is adjacent to the first pixel group, among the plurality of pixel groups, is a short exposure pixel.

Each of the plurality of pixel groups may include four pixels along two rows and two columns, and the second, third, and fourth pixels may be red, blue, and green color pixels, respectively.

The second to fourth pixels belonging to the first pixel group may be short exposure pixels, and the second to fourth pixels belonging to the second pixel group may be long exposure pixels.

At least one of the second to fourth pixels belonging to the first pixel group may be a long exposure pixel, and the at least one of the second to fourth pixels belonging to the second pixel group may be a short exposure pixel.

The second pixel group may be adjacent to the first pixel group in a horizontal direction, and the first pixel belonging to a third pixel group that is adjacent to the first pixel group in a vertical direction, among the plurality of pixels groups, may be a short exposure pixel.

The plurality of pixel groups may be arranged along m rows and n columns, where m and n are integers equal to or greater than 3, and the first pixel belonging to a pixel group along a first row and a first column, the first pixel belonging to a pixel group along the first row and a third column, the first pixel belonging to a pixel group along a third row and the first column, and the first pixel belonging to a pixel group along the third row and the third column may be electrically connected to each other in a low resolution mode.

The plurality of pixel groups may be arranged along m rows and n columns, where m and n are integers equal to or greater than 2, and the first pixel belonging to a pixel group along a first row and a first column and the first pixel belonging to a pixel group along a second row and a second column may be electrically connected to each other in a low resolution mode.

According to an aspect of another exemplary embodiment, there is provided an image sensor including: a pixel array including a plurality of pixel groups, each pixel group including one or more long exposure pixels and one or more short exposure pixels, wherein each pixel group includes a first pixel having a white component; and a compensator configured to receive pixel data from the pixel array and to compensate for the first pixel by using pixel data received from pixels having different color components, wherein the first pixel is compensated for using pixel data received from one or more color pixels having a same exposure time as the first pixel.

According to an aspect of another exemplary embodiment, there is provided a pixel array of an image sensor, the pixel array including: a plurality of pixel groups, each pixel group including: one or more long exposure pixels; and one or more short exposure pixels, wherein each pixel group includes, from among the one or more long exposure pixels and the one or more short exposure pixels, a first pixel having a white component and a second pixel having a first color component.

BRIEF DESCRIPTION OF THE DRAWINGS

Exemplary embodiments will be more clearly understood from the following detailed description taken in conjunction with the accompanying drawings in which:

FIGS. 9, 10A, and 10B illustrate grouping pixels according to a high resolution mode and a low resolution mode, according to exemplary embodiments.

DETAILED DESCRIPTION OF EXEMPLARY EMBODIMENTS

Hereinafter, exemplary embodiment will be described in detail with reference to the accompanying drawings without any other intention except for an intention to provide a thorough understanding to those of ordinary skill in the art.

As used herein, the term "and/or" includes any and all combinations of one or more of the associated listed items Expressions such as "at least one of," when preceding a list of elements, modify the entire list of elements and do not modify the individual elements of the list.

Figure 1:
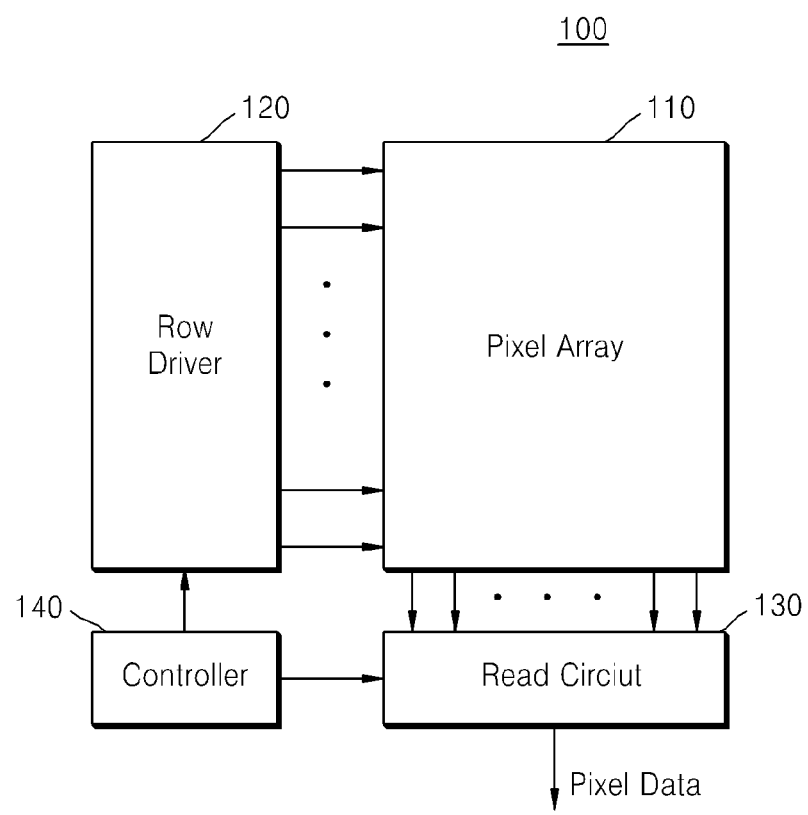
FIG. 1 is a block diagram of a pixel array and an image sensor including the same, according to an exemplary embodiment.

FIG. 1 is a block diagram of a pixel array 110 and an image sensor 100 including the same, according to an exemplary embodiment. As shown in FIG. 1, the image sensor 100 may include the pixel array 110, a row driver 120, a read circuit 130, and a controller 140. The image sensor 100 may be a complementary metal-oxide semiconductor (CMOS) image sensor.

The controller 140 may control the row driver 120 and the read circuit 130. The pixel array 110 may include a plurality of pixels, each pixel including a light detection element. The light detection element may detect light in each corresponding pixel and generate an electrical signal according to the intensity of the detected light. The light detection element may include a photodiode, a photogate, a phototransistor, and the like.

The pixel array 110 may output the electrical signal according to the light absorbed by the light detection element to the read circuit 130. The row driver 120 may output a signal for controlling each pixel included in the pixel array 110. For example, the row driver 120 may output a signal for controlling the light detection element included in each pixel to be reset or to be sampled (i.e., to output an electrical signal according to charges accumulated in the light detection element).

The read circuit 130 may receive the electrical signal output from the pixel array 110 and output pixel data. For example, the read circuit 130 may include an analog-to-digital converter (ADC) and output, as pixel data, a digital signal corresponding to an analog signal received from the pixel array 110.

Figure 2A:
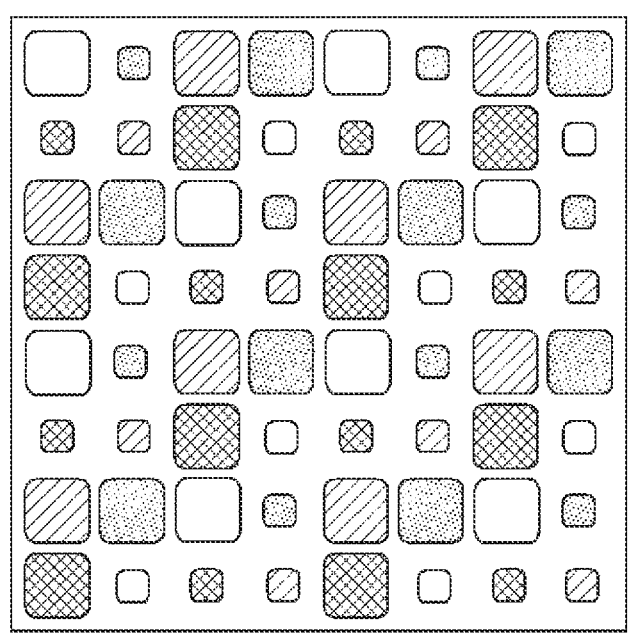
FIGS. 2A and 2B illustrate pixels applied to the image sensor of FIG. 1.
Figure 2B:
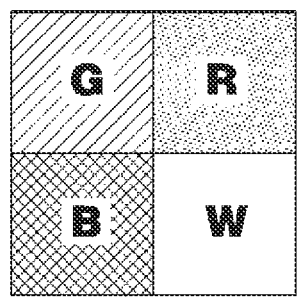

An example of the pixel array 110 of the image sensor 100 illustrated in FIG. 1 will now be described. FIGS. 2A and 2B illustrate pixels applied to the image sensor 100 of FIG. 1.

A dynamic range indicates a brightness range of an image, which may be losslessly acquired by the image sensor 100. That is, when the dynamic range is high, the image sensor 100 may detect a wider range of brightnesses of images as compared to when the dynamic range is low. The dynamic range of the image sensor 100 may be enhanced by adjusting light-exposure times of pixels included in the pixel array 110. That is, the dynamic range may be enhanced by adjusting the light-exposure times so that a capacity of charges stored by absorbing light by light detection elements of some pixels is different from a capacity of charges stored by absorbing light by light detection elements of some other pixels.

According to one or more exemplary embodiments, as a pixel pattern for realizing a high dynamic range, the pixel array 110 may include a plurality of pixels exposed to the light for a relatively long time and a plurality of pixels exposed to the light for a relatively short time. For example, as shown in FIG. 2A, pixels displayed as a large quadrangle may correspond to long exposure pixels, and pixels displayed as a small quadrangle may correspond to short exposure pixels. When 2×2 pixels (i.e., four pixels) are defined as a single pixel group (i.e., a unit pixel group), each unit pixel group may include one long exposure pixel and three short exposure pixels according to an exemplary embodiment. However, it is understood that one or more other exemplary embodiments are not limited thereto and any variety of long exposure pixels and short exposure pixels may be provided in a unit pixel group. For example, according to another exemplary embodiment, each unit pixel group may include three long exposure pixels and one short exposure pixel. Furthermore, the ratio of long exposure pixels and short exposure pixels may vary in each unit pixel group of the pixel array (as shown in FIG. 2A). Also, it is understood that the number of pixels in a unit pixel group is not limited to four in all exemplary embodiments. In this regard, according to one or more other exemplary embodiments, the total number of pixels in a unit pixel group, as well as the number of long exposure pixels belonging to each unit pixel group, may be variably adjusted.

To prevent the deterioration in the performance according to the miniaturization of sizes of pixels of the image sensor 100, an RGBW pattern including a white pixel may be applied, as shown in FIG. 2B. For example, when it is assumed that one unit pixel group includes 2×2 pixels (i.e., four pixels), each unit pixel group may include one white pixel and a plurality of color pixels. For example, the plurality of color pixels may be red, green, and blue color pixels. The white pixel is a pixel having a wavelength band corresponding to the red, green, and blue color pixels. Thus, the white pixel may be defined as a wideband color pixel, and the red, green, and blue color pixels may be defined as narrowband color pixels.

According to one or more exemplary embodiments, in the pixel array 110, each unit pixel group includes one or more long exposure pixels and one or more short exposure pixels to improve the dynamic range and includes at least one white pixel to improve the sensitivity of the pixels.

Figure 3:
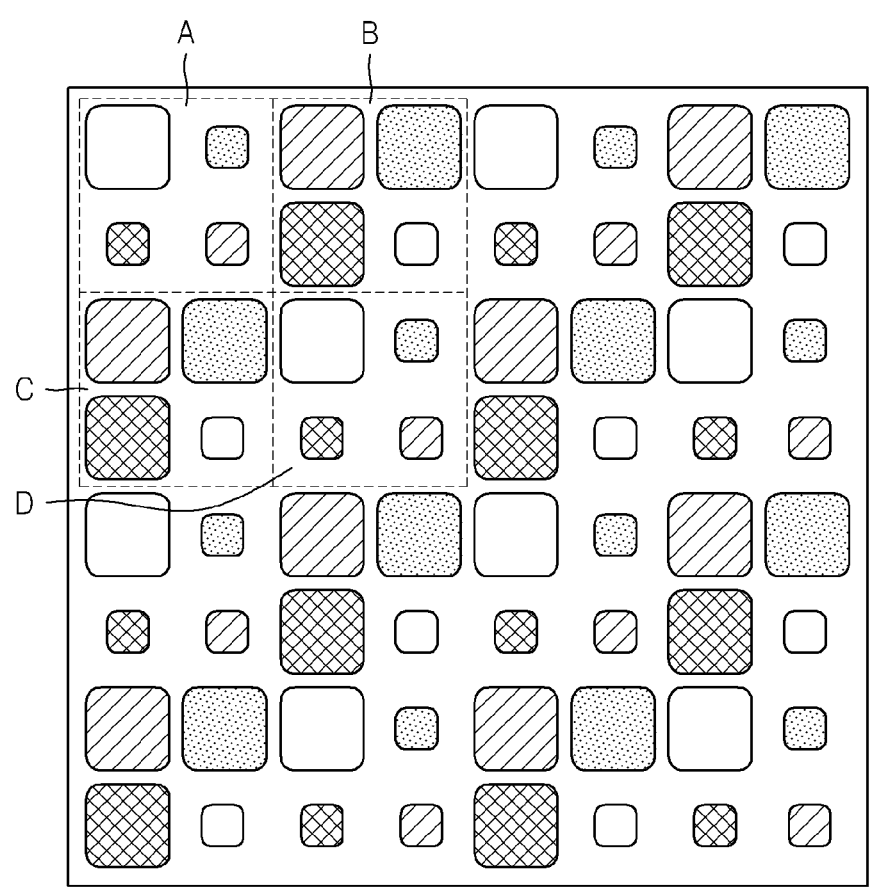
FIG. 3 is illustrates a pixel array of an image sensor, according to an exemplary embodiment.

FIG. 3 is illustrates a pixel array of an image sensor, according to an exemplary embodiment. As described above, the pixel array may include a plurality of pixels arranged along a plurality of rows and a plurality of columns, and for example, one unit pixel group defined by pixels arranged along two rows and two columns may include four pixels. The pixel array may include a plurality of long exposure pixels and a plurality of short exposure pixels. The pixel array may include a plurality of white pixels and a plurality of other color pixels (e.g., first to third color pixels). The first to third color pixels may be red, green, and blue color pixels. However, the above description is only illustrative, and other color pixels (e.g., cyan (Cy), magenta (Mg), yellow (Ye) colors, or the like) may be applied to the first to third color pixels in one or more other exemplary embodiments.

The pixel array may have the same types of pixels which are repeatedly arranged with a certain interval. For example, as shown in FIG. 3, the same types of pixels may be repeatedly arranged on the basis of a group including 4×4 pixels (e.g., 16 pixels). The 4×4 pixels may include first to fourth unit pixel groups A to D defined as described above.

The first unit pixel group A may include one white pixel and three color pixels (hereinafter, referred to as first to third color pixels). In addition, some of the pixels may be long exposure pixels, and the other pixels may be short exposure pixels. In the first unit pixel group A, the white pixel corresponds to a long exposure pixel, and the first to third color pixels correspond to short exposure pixels.

The second unit pixel group B and the third unit pixel group C may be arranged so as to respectively be horizontally and vertically adjacent to the first unit pixel group A. Each of the second unit pixel group B and the third unit pixel group C may include the white pixel. According to the present exemplary embodiment, each of the second unit pixel group B and the third unit pixel group C may include the white pixel corresponding to a short exposure pixel. In addition, the second unit pixel group B may include the first to third color pixels corresponding to long exposure pixels, and the third unit pixel group C may also include the first to third color pixels corresponding to long exposure pixels.

The fourth unit pixel group D may include the white pixel corresponding to a long exposure pixel. In addition, the fourth unit pixel group D may include the first to third color pixels corresponding to short exposure pixels.

The long exposure pixels and the short exposure pixels may be controlled to be exposed to light for different lengths of time. For example, the long exposure pixels and the short exposure pixels may be controlled so that the long exposure pixels are selectively exposed to the light for a relatively long period of time, and then the remaining short exposure pixels are selectively exposed to the light for a relatively short period of time. Alternatively, the pixels may be controlled by a separate light-exposure control for each pixel so that some pixels (i.e., long exposure pixels) are exposed to the light for a relatively long period of time, and the other some pixels (i.e., short exposure pixels) are exposed to the light for a relatively short period of time. By the above control, pixel data having different light-exposure times in one image frame may be obtained.

When white pixels are arranged, a white pixel corresponding to a long exposure pixel and a white pixel corresponding to a short exposure pixel may be alternately arranged from one white pixel to the next in either or both of a horizontal direction and a vertical direction. For example, when one white pixel is arranged in each unit pixel group, a white pixel corresponding to a long exposure pixel and a white pixel corresponding to a short exposure pixel may be alternately arranged in every unit pixel group along the horizontal direction of the pixel array. Likewise, a white pixel corresponding to a long exposure pixel and a white pixel corresponding to a short exposure pixel may be alternately arranged in every unit pixel group along the vertical direction of the pixel array. The above method of alternately arranging a long exposure pixel and a short exposure pixel may also be applied to the color pixels in the same or similar way. For example, as shown in FIG. 3, for the first to third color pixels, when color pixels corresponding to short exposure pixels are arranged in any one unit pixel group (e.g., the first pixel group A), color pixels corresponding to long exposure pixels may be arranged in unit pixel groups (e.g., the second and third pixel groups B and C) that are adjacent to the one unit pixel group.

According to the above pattern of the pixel array, a high dynamic range and a white pixel may be simultaneously applied, and thus, it may be effective to improve image quality. In addition, by properly arranging white pixels corresponding to a long exposure pixel and white pixels corresponding to a short exposure pixel, various functions (e.g., a binning function according to an image quality mode and a Bayer pattern generation function) which can be provided by the image sensor may also be provided.

Although an example of arranging white pixels according to an exemplary embodiment has been described on the basis of a unit pixel group with reference to FIG. 3, one or more other exemplary embodiments are not limited to the above-described arrangement. For example, according to another exemplary embodiment, a plurality of white pixels may be arranged according to a specific pattern, and a white pixel exposed to the light for a relatively long time and a white pixel exposed to the light for a relatively short time are alternately arranged in a first direction (e.g., the horizontal direction) of the pixel array. Similarly, according to another exemplary embodiment, a white pixel exposed to the light for a relatively long time and a white pixel exposed to the light for a relatively short time are alternately arranged in a second direction (e.g., the vertical direction) of the pixel array.

Figure 4A:
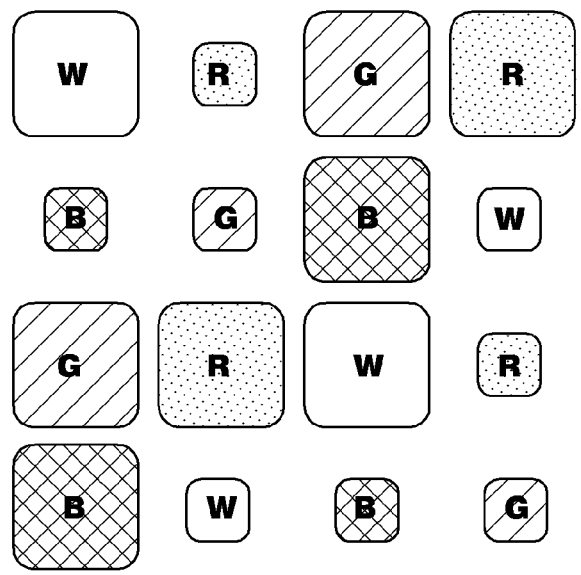
FIGS. 4A and 4B illustrate pixel arrays according to exemplary embodiments.
Figure 4B:
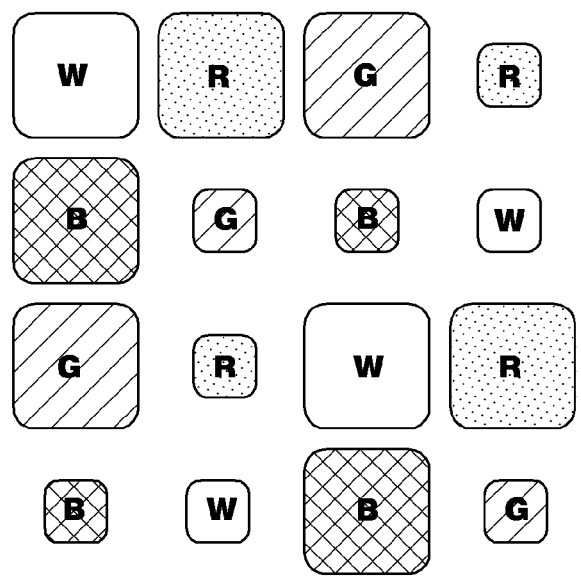

FIGS. 4A and 4B illustrate pixel arrays according to exemplary embodiments. As shown in FIGS. 4A and 4B, the pixel array may include a plurality of white pixels and a plurality of R, G, and B pixels.

FIG. 4A shows an example of a pixel array of an image sensor according to an exemplary embodiment, in which one unit pixel group includes a white pixel and R, G, and B pixels, and when the white pixel corresponds to a long exposure pixel, the R, G, and B pixels correspond to short exposure pixels. On the contrary, when the white pixel corresponds to a short exposure pixel, the R, G, and B pixels may correspond to long exposure pixels.

FIG. 4B shows an example of a pixel array of an image sensor according to another exemplary embodiment, in which a white pixel arranged in one unit pixel group corresponds to a long exposure pixel, some of R, G, and B pixels correspond to long exposure pixels, and the other of the R, G, and B pixels correspond to short exposure pixels. For example, a white pixel and a green color pixel belonging to one unit pixel group may correspond to different types of pixels, and accordingly, when the white pixel in the unit pixel group corresponds to a long exposure pixel, the green color pixel may correspond to a short exposure pixel. The pixel arrangements shown in FIGS. 4A and 4B are only illustrative, and the pixel arrangements of pixel arrays may vary in various exemplary embodiments.

Figure 5:
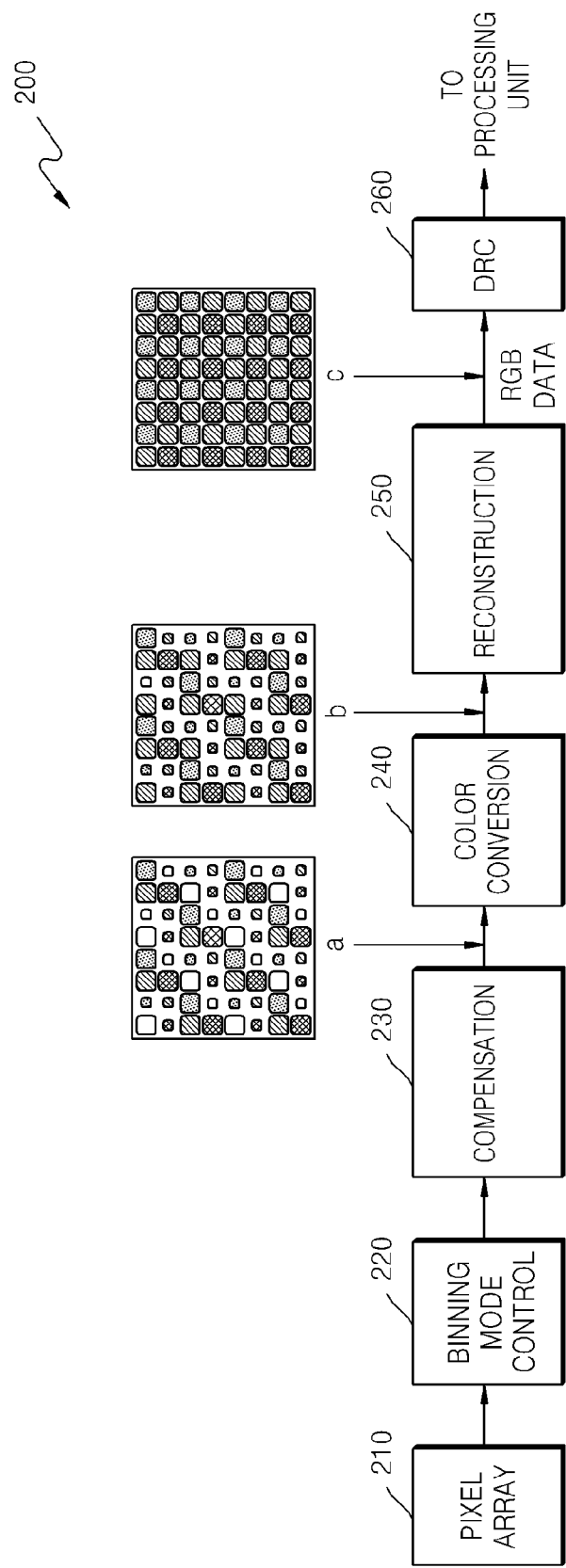
FIG. 5 is a block diagram of an image sensor according to an exemplary embodiment.

FIG. 5 is a block diagram of an image sensor 200 according to an exemplary embodiment. An operation of the image sensor 200 will now be described with reference to the pixel array of FIG. 3.

As shown in FIG. 5, the image sensor 200 may include a pixel array 210, a binning mode controller 220, a compensator 230, a color converter 240, a reconstructor 250, and a dynamic range compressor (DRC) 260. Pixel data read from the pixel array 210 may be provided to the compensator 230 via the read circuit 130 shown in FIG. 1. Under control of the binning mode controller 220, pixel data having relatively high resolution may be provided to the compensator 230 when a high image quality mode is selected, and pixel data having relatively low resolution may be provided to the compensator 230 when a low image quality mode is selected.

The compensator 230 compensates for one or more pixels by processing the received pixel data. For example, to compensate for a white pixel, the compensator 230 may perform a compensation operation by computing data values of one or more pixels that are adjacent to the white pixel.

For example, to compensate for a white pixel corresponding to a long exposure pixel, data of color pixels corresponding to long exposure pixels may be used. In this case, and by way of example, to compensate for a first pixel (i.e., white pixel) in the first unit pixel group A in FIG. 3, data of at least one color pixel of the long exposure pixels belonging to the second and third unit pixel groups B and C that are adjacent to the first unit pixel group A and to the fourth unit pixel group D that is diagonally located from the first unit pixel group A may be used. In more detail, data of at least a portion of the color pixels corresponding to long exposure pixels belonging to the second unit pixel group B and data of at least a portion of the color pixels corresponding to long exposure pixels belonging to the third unit pixel group C may be used to compensate for the first pixel (i.e., white pixel) in the first unit pixel group A.

Likewise, to compensate for a white pixel corresponding to a short exposure pixel, data of color pixels corresponding to short exposure pixels may be used. For example, to compensate for the first pixel (i.e., white pixel) in the second unit pixel group B in FIG. 3, data of at least some color pixels of the short exposure pixels belonging to unit pixel groups that are adjacent (e.g., adjacent in at least one of up, down, left, and right directions) to the second unit pixel group B may be used. In more detail, data of the color pixels corresponding to short exposure pixels belonging to the first unit pixel group A and the fourth unit pixel group D may be used to compensate for the first pixel (white pixel) in the second unit pixel group B.

According to the pixel data output from the compensator 230, as shown in a of FIG. 5, along with the generation of data values corresponding to RGBW colors, some pieces of pixel data correspond to pixel data according to light exposure for a relatively long time, and other pieces of pixel data correspond to pixel data according to light exposure for a relatively short time. The color converter 240 performs a color conversion operation for converting the RGBW colors into RGB colors. For example, to convert pixel data having RGBW color components into RGB color components corresponding to a standard image signal, the color converter 240 may calculate pixel data corresponding to the RGB color components by computing the pixel data having RGBW color components according to a predetermined algorithm. According to the pixel data output from the color converter 240, as shown in b of FIG. 5, data values corresponding to RGB colors are generated, wherein some of the data values may correspond to pixel data according to light exposure for a relatively long time, and the other data values may correspond to pixel data according to light exposure for a relatively short time.

The reconstructor 250 outputs RGB data by computing the pixel data received from the color converter 240. The reconstructor 250 may perform signal reconstruction for dynamic range control. For example, the reconstructor 250 may receive pixel data having a fixed quantity of bits and generate and output RGB data of which the number of bits is converted from the fixed quantity of bits.

The DRC 260 may compress the converted RGB data without dynamic range loss. For example, after the above reconstruction operation, a bit depth may increase, but the DRC 260 functions to compress the bit depth-increased RGB data without loss, and according to the compression function of the DRC unit 260, a general-use processor may be used for a post-processing operation. The compressed RGB data output from the DRC 260 may be provided to a processing unit for performing image processing thereafter.

As shown in c of FIG. 5, RGB data finally converted to an RGB Bayer pattern may be provided to the processing unit.

According to the above-described exemplary embodiment, white pixels may be applied to a pattern of a pixel array having a high dynamic range, the white pixels may be compensated for by a pixel compensation operation, and RGB data having an RGB Bayer pattern may be generated through a color conversion operation and a reconstruction operation on the compensated pixel data. Accordingly, RGB data of which sensitivity is improved may be provided to the processing unit.

While the above-described exemplary embodiment is with reference to an RGB color system, it is understood that one or more other exemplary embodiments are not limited thereto. For example, the color pixels may correspond to cyan (Cy), magenta (Mg), and yellow (Ye) colors in another exemplary embodiment.

Figure 6A:
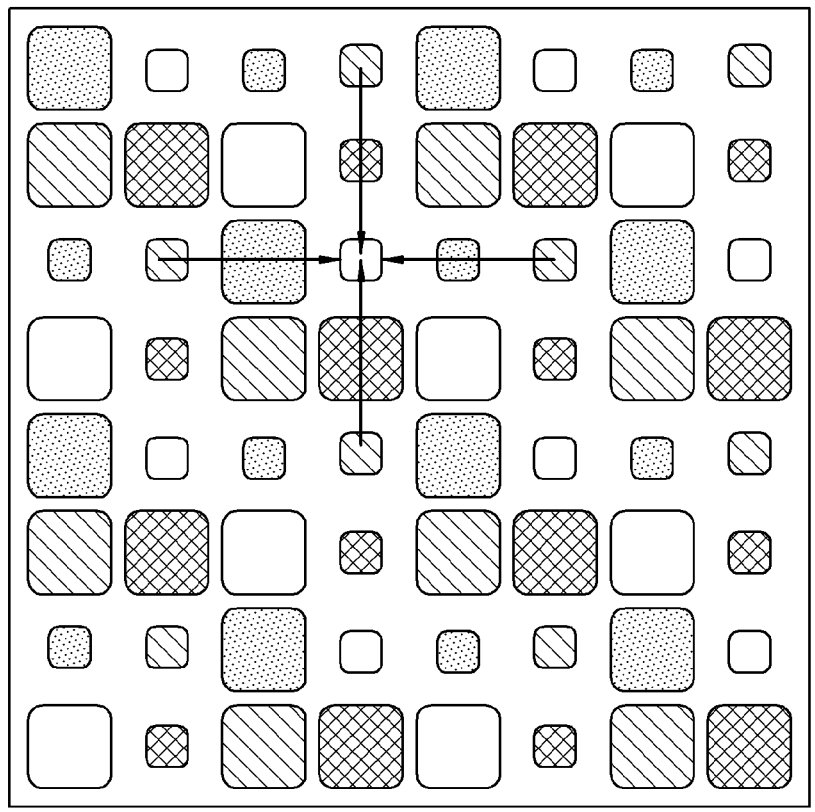
FIGS. 6A and 6B illustrate compensation of a white pixel according to exemplary embodiments.
Figure 6A:
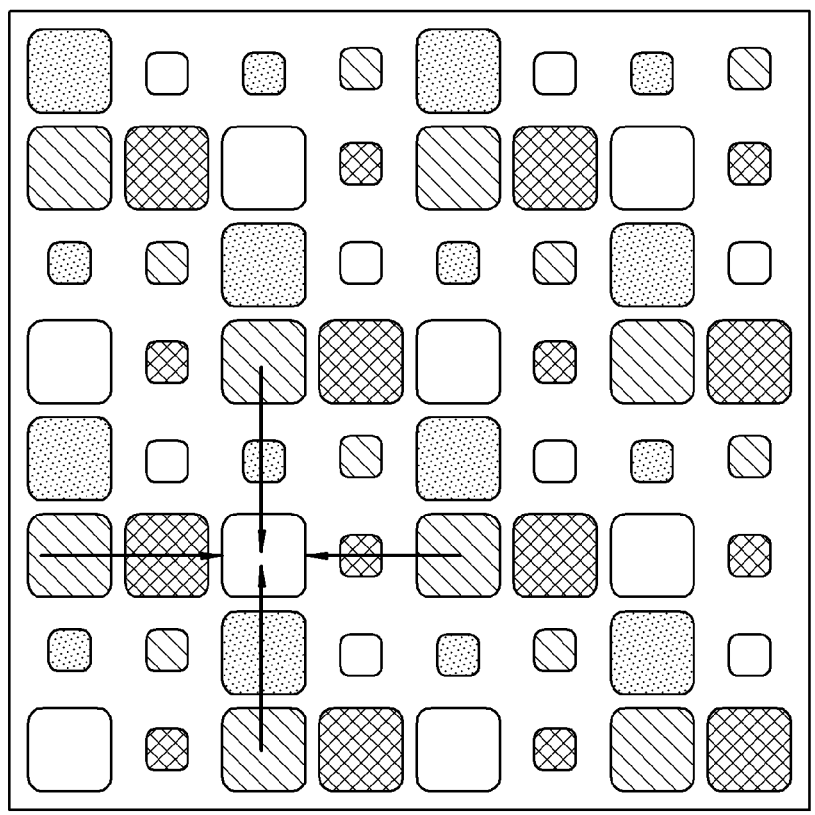
Figure 6B:
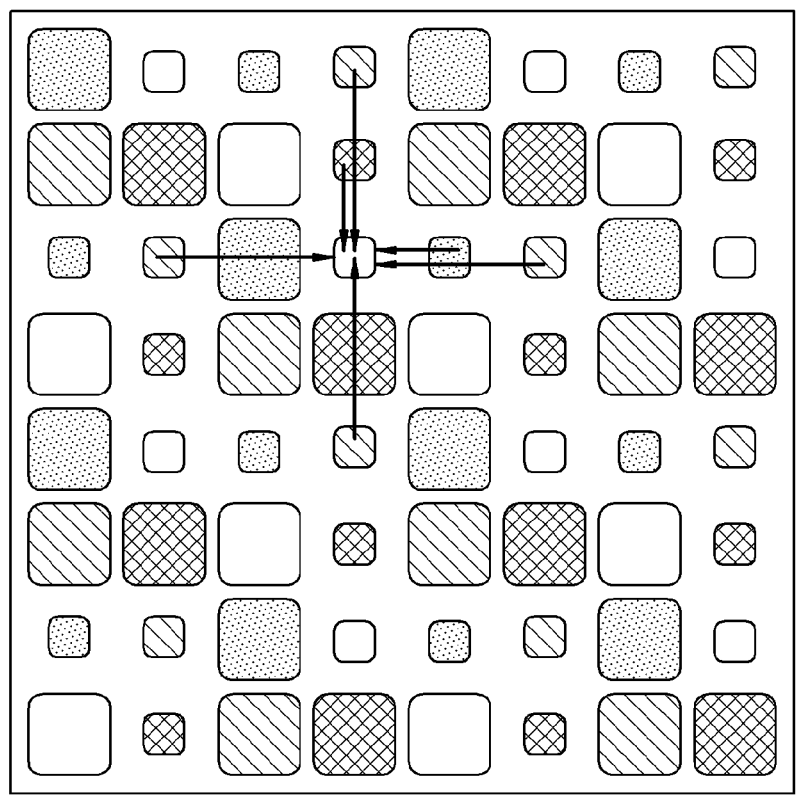
Figure 6B:
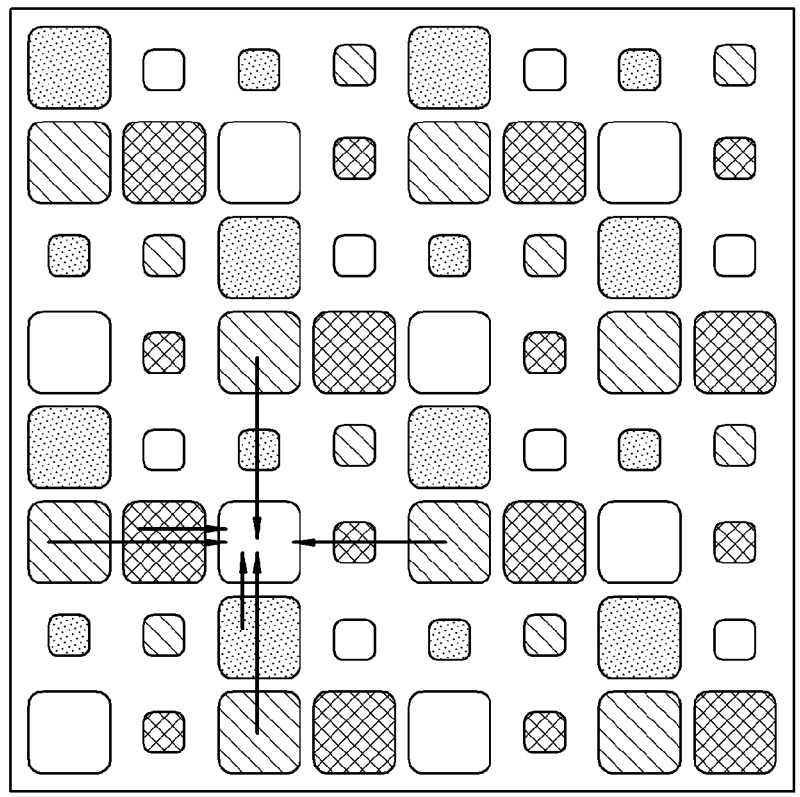

FIGS. 6A and 6B illustrate compensation of a white pixel according to exemplary embodiments. FIG. 6A illustrates a compensation operation when a same color domain is used, and FIG. 6B illustrates a compensation operation when all color domains are used.

As shown in FIG. 6A, to compensate for a white pixel corresponding to a long exposure pixel, data of any one-color pixels corresponding to long exposure pixels from among pixels belonging to adjacent unit pixel groups may be used. FIG. 6A shows an example in which data of green-color pixels is used. Likewise, to compensate for a white pixel corresponding to a short exposure pixel, data of green-color pixels corresponding to short exposure pixels from among pixels belonging to adjacent unit pixel groups may be used.

As shown in FIG. 6B, to compensate for a white pixel belonging to any one unit pixel group, data of two or more color pixels belonging to one or more adjacent unit pixel groups may be used. For example, as shown in FIG. 6B, to compensate for a white pixel corresponding to a long exposure pixel, data of color pixels that are vertically and horizontally located to the white pixel from among color pixels corresponding to long exposure pixels belonging to adjacent unit pixel groups may be used.

In more detail, as shown in FIG. 6B, data of four green color pixels, one red color pixel, and one blue color pixel, from among color pixels corresponding to long exposure pixels belonging to adjacent unit pixel groups, may be used to compensate for the white pixel corresponding to a long exposure pixel. The above compensation operation may be applied to compensate for a white pixel corresponding to a short exposure pixel in the same or similar way.

The compensator 230 of FIG. 5 may include information regarding locations of the long exposure pixels and/or short exposure pixels and locations of the white pixels in the pixel arrays described above. In various exemplary embodiments, the compensator 230 may include information regarding locations of both the long exposure pixels and the short exposure pixels, or information regarding locations of only one from among the long exposure pixels and the short exposure pixels. In the latter case, the locations of the other from among the long exposure pixels and the short exposure pixels may be inferred from the locations of the one from among the long exposure pixels and the short exposure pixels. Similarly, in various exemplary embodiments, the compensator 230 may include information on the locations of the white pixels and the locations of color pixels, or may include information regarding locations of only one from among the white pixels and the color pixels. Accordingly, in compensating for a white pixel, whether the white pixel to be compensated for is a long exposure pixel or a short exposure pixel may be determined. In addition, color components and/or long/short exposure pixels of color pixels arranged adjacently to the white pixel may be determined. According to the determination results, the compensation operation on the white pixels as shown in FIGS. 6A and 6B may be performed.

Figure 7:
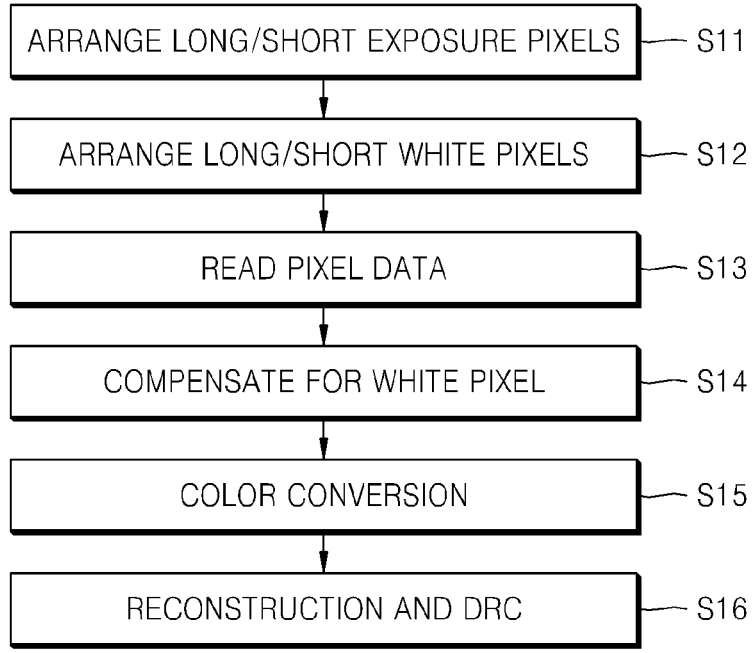
FIG. 7 is a flowchart of a method of operating an image sensor, according to an exemplary embodiment.

FIG. 7 is a flowchart of a method of operating an image sensor, according to an exemplary embodiment.

As shown in FIG. 7, to implement a pixel array included in the image sensor, some of a plurality of pixels are arranged as long exposure pixels, and the remaining pixels are arranged as short exposure pixels in operation S11. Any one of the above-described exemplary embodiments may be applied as an arrangement example of the long exposure pixels and short exposure pixels to improve a dynamic range. For example, when any one pixel in a unit pixel group including 2×2 pixels is arranged as a long exposure pixel, the other three pixels may be arranged as short exposure pixels. Alternatively, two or more long exposure pixels may be arranged in one unit pixel group. The pixels arranged in operation S11 may be color pixels having color components among pixels included in the pixel array.

To prevent deterioration in sensitivity according to the reduction in a pixel size, white pixels are applied to the pixel array included in the image sensor in operation S12. For example, locations of the white pixels may be determined according to the arrangement of the long exposure pixels and the short exposure pixels, and any one of the above-described embodiments for arranging white pixels may be applied. One pixel in a unit pixel group including 2×2 pixels may be arranged as a white pixel, and the other pixels may be arranged as the other color pixels (e.g., RGB pixels). In addition, in the arrangement of the white pixels, the white pixels may be arranged as long exposure pixels and/or short exposure pixels according to the above-described exemplary embodiments. While the present exemplary embodiment determines locations of the white pixels according to the arrangement of the long exposure pixels and the short exposure pixels, it is understood that one or more other exemplary embodiments are not limited thereto. For example, according to another exemplary embodiment, the locations of the white pixels may be determined prior to or substantially simultaneously as the locations of the long exposure pixels and the short exposure pixels. Additionally, according to another exemplary embodiment, the locations of the white pixels may be determined prior to the locations of the long exposure pixels and the short exposure pixels, and the locations of the long exposure pixels and the short exposure pixels may be determined according to the locations of the white pixels. Furthermore, it is understood that the above-described operations S11 and S12 may be implemented in a method of manufacturing the image sensor or the pixel array for the image sensor according to one or more exemplary embodiments.

A light exposure operation on the pixel array is performed, and pixel data is read from the pixel array in operation S13. To read the pixel data, data may be read using separate control lines for color pixels and white pixels. As in the above-described exemplary embodiments, light exposure control is performed so that long exposure pixels are exposed to the light for a relatively long time, and short exposure pixels are exposed to the light for a relatively short time. According to the above operation, RGBW pixel data may be obtained (or pixel data of a different color space in another exemplary embodiment), and a white pixel is compensated for using pixel data of at least one color pixel in operation S14.

In compensating for a white pixel, when a white pixel to be compensated for corresponds to a long exposure pixel, data of color pixels corresponding to long exposure pixels from among color pixels adjacent to the white pixel may be used. On the contrary, when a white pixel to be compensated for corresponds to a short exposure pixel, data of color pixels corresponding to short exposure pixels from among color pixels adjacent to the white pixel may be used. That is, to compensate for data of a white pixel belonging to one unit pixel group, data of color pixels belonging to other pixel groups and exposed to the light for the same time as the white pixel may be used instead of data of color pixels belonging to the same pixel group as the white pixel.

The RGBW pixel data generated according to the above-described pixel data compensation is converted into RGB pixel data through a color conversion operation in operation S15. In addition, RGB data converted to an RGB Bayer pattern is generated through a reconstruction operation on the converted RGB data, and RGB data compressed by a DRC operation is provided to a processing unit in operation S16.

Figure 8:
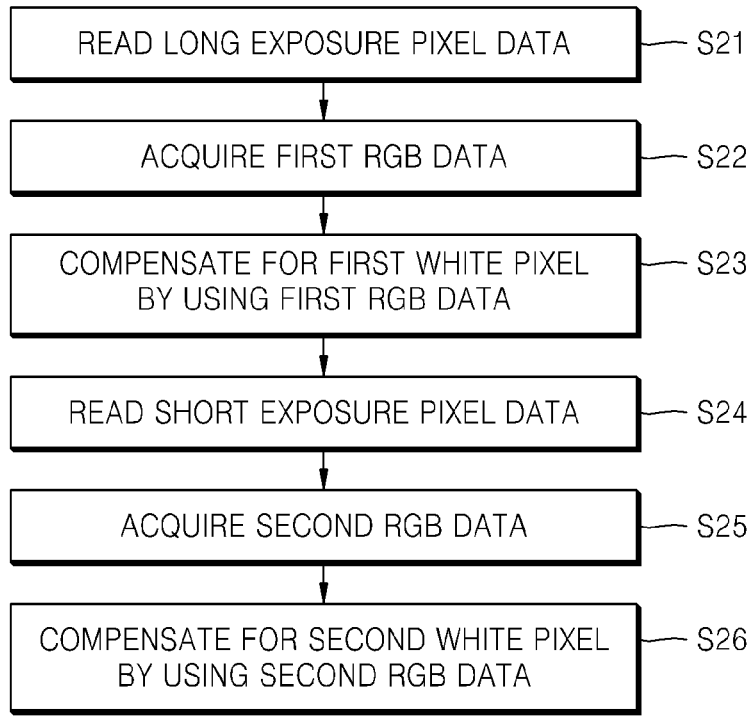
FIG. 8 is a flowchart of a method of operating an image sensor, according to another exemplary embodiment.

FIG. 8 is a flowchart of a method of operating an image sensor, according to another exemplary embodiment. With reference to FIG. 8, a detailed example of a compensation operation on a white pixel according to another exemplary embodiment is described.

As shown in FIG. 8, pixel data is read from pixels arranged as long exposure pixels among a plurality of pixels included in a pixel array in operation S21. According to a pixel data read operation, color data (e.g., first RGB data) corresponding to long exposure pixels is acquired in operation S22, and a first white pixel (e.g., a white pixel corresponding to a long exposure pixel) is compensated for using at least a portion of the acquired first RGB data in operation S23. The first white pixel may belong to a first unit pixel group, and the first RGB data may belong to one or more other unit pixel groups that are adjacent to the first unit pixel group.

Additionally, pixel data is read from pixels arranged as short exposure pixels among the plurality of pixels included in the pixel array in operation S24. Although it has been described that a pixel data read operation on long exposure pixels and a pixel data read operation on short exposure pixels are separately performed, the pixel data read operations on long exposure pixels and short exposure pixels may be performed at or substantially at the same time. Color data (e.g., second RGB data) is acquired through a short exposure operation in operation S25, and a second white pixel (e.g., a white pixel corresponding to a short exposure pixel) is compensated for using at least a portion of the acquired second RGB data in operation S26.

Although FIG. 8 shows that data of short exposure pixels is read after data of long exposure pixels is read, it is understood that one or more other exemplary embodiments are not limited thereto. For example, when pixels belonging to rows of the image sensor are sequentially read, data of long exposure pixels and short exposure pixels belonging to the same row may be read at the same time. That is, operations S21 to S23 and operations S24 to S26 may be performed at substantially the same time (or in parallel). Furthermore, data of short exposure pixels may be read before data of long exposure pixels is read.

Figure 9:
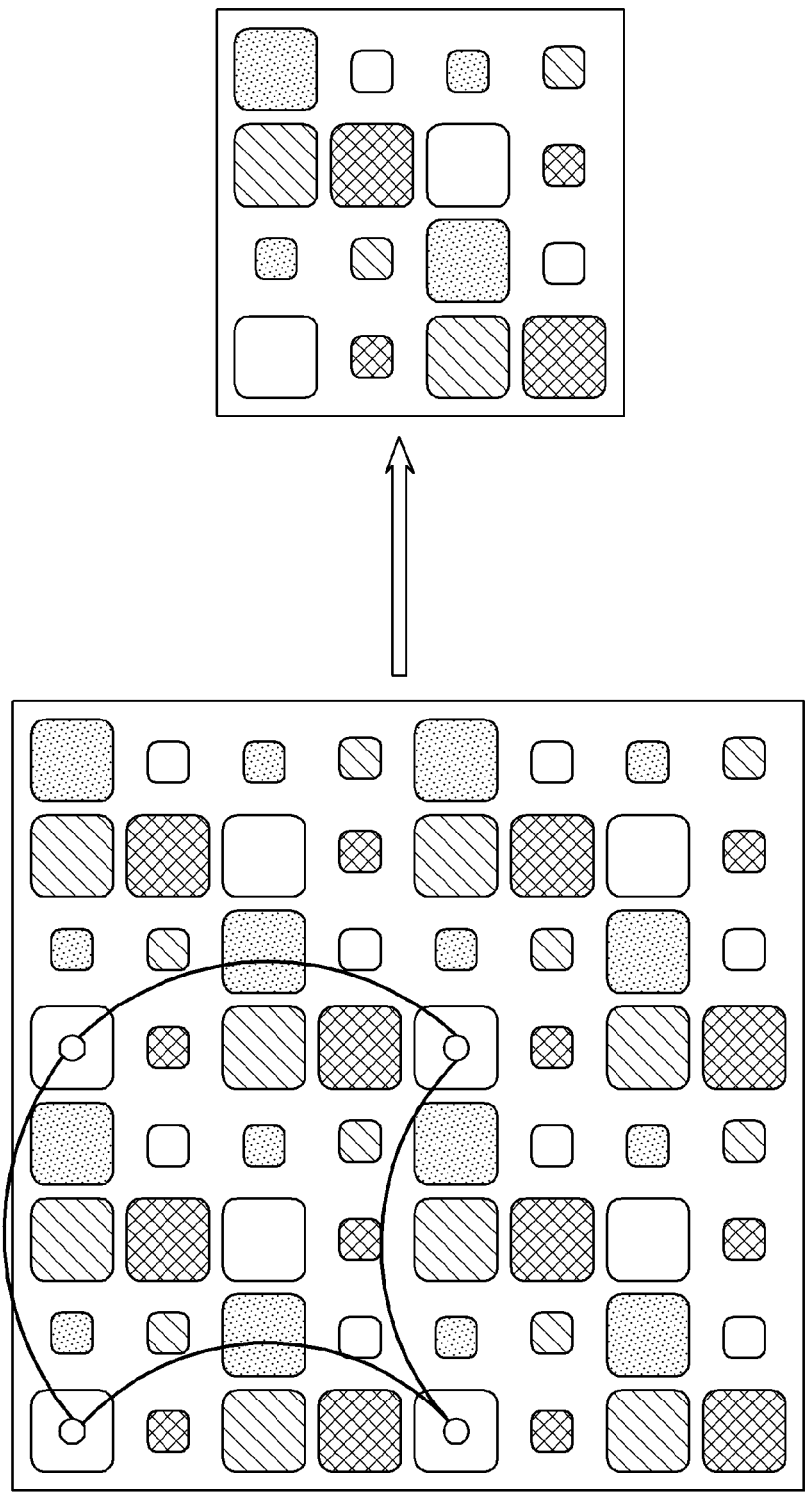
Figure 10B:
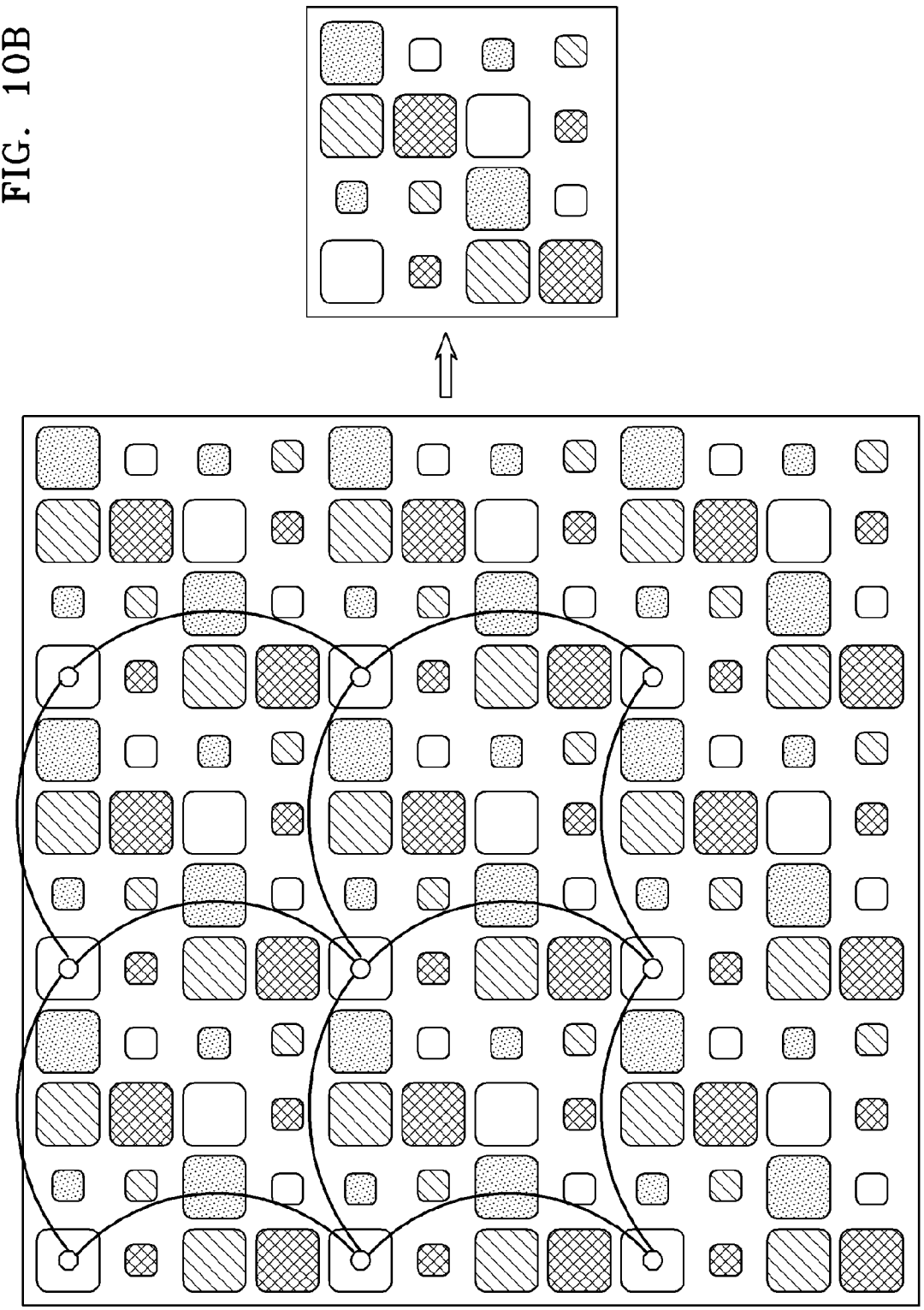

FIGS. 9, 10A, and 10B illustrate grouping (or binning) pixels according to a high resolution mode and a low resolution mode, according to exemplary embodiments. Based on patterns of pixels included in a pixel array according to exemplary embodiments, various examples for binning the pixels are shown. An output pattern may be the same as a pattern of pixels included in an original pixel array, wherein FIG. 9 illustrates a binning operation of grouping four pixels, FIG. 10A illustrates a binning operation of grouping two pixels, and FIG. 10B illustrates a binning operation of grouping nine pixels.

Referring to FIG. 9, when the low resolution mode is selected, four pixels having a same color component in a pixel array are electrically connected to each other. In the pixel array, 8×8 pixels may be defined as one group, and a binning operation may be repeated in the same method for every group. When the 8×8 pixels are defined as first- to eighth-row and first- to eighth-column pixels, pixels having a same light exposure time and a same color component may be electrically connected to each other. For example, a first-row and first-column white pixel, a first-row and fifth-column white pixel, a fifth-row and first-column white pixel, and a fifth-row and fifth-column white pixel (long exposure pixels) may be electrically connected to each other.

Although a detailed connection state is not shown in FIG. 9, similarly to the above description, another set of four pixels having a same light exposure time and a same color component may be electrically connected to each other, and accordingly, pixel data corresponding to 4×4 pixels may be generated from one group including 8×8 pixels. According to the reduction in the number of bits, a time taken and power consumed to process the pixel data may be decreased.

Referring to FIG. 10A, when the low resolution mode is selected, two pixels having a same color component in a pixel array may be electrically connected to each other. FIG. 10A shows an example in which a binning operation in a diagonal direction is performed. One group including 8×8 pixels may be defined as four sub-groups each including 4×4 pixels, and a binning operation on some sub-groups may be different from a binning operation on the other some sub-groups. Similarly to the illustration in FIG. 9, in the binning operation in FIG. 10A, pixels having a same light exposure time and a same color component may also be electrically connected to each other.

For example, as shown in FIG. 10A, the four sub-groups each including 4×4 pixels may include pixels having a same pattern. Pixels having a same light exposure time and a same color component in one sub-group (e.g., a first sub-group A) including 4×4 pixels may be electrically connected to each other. In detail, two white pixels corresponding to long exposure pixels in the first sub-group A may be connected to each other, and two same color pixels corresponding to short exposure pixels may be connected to each other. According to the above-described connection method, pixel data corresponding to four pixels may be generated from the first sub-group A.

FIG. 10A illustrates an example in which a same binning operation is performed for the first sub-group A and a fourth sub-group D having a same connection state, and in a second sub-group B, two white pixels corresponding to short exposure pixels may be connected to each other, and two same color pixels corresponding to long exposure pixels may be connected to each other. In addition, a same binning operation is performed for the second sub-group B and a third sub-group C having a same connection state. According to the exemplary embodiment illustrated in FIG. 10A, pixel data corresponding to 4×4 pixels may be generated from one group including 8×8 pixels. FIG. 10A merely corresponds to one exemplary embodiment, and a binning operation may be performed via other methods according to connection states.

FIG. 10B shows an example in which 3×3 pixels are electrically connected to each other, and as shown in FIG. 10B, an example in which one pixel group including 12×12 pixels is defined, wherein nine sub-groups each including 4×4 pixels are defined, is shown. Pixels (or white pixels) having a same light exposure time and a same color component, which belong to each sub-group, may be electrically connected to each other. In this case, pixel data corresponding to 4×4 pixels may be generated from one group including 12×12 pixels.

The examples of the binning operations illustrated in FIGS. 9, 10A, and 10B correspond to some exemplary embodiments, and it is understood that other exemplary embodiments may vary from the binning operations illustrated in FIGS. 9, 10A, and 10B. For example, pixel data corresponding to 4×4 pixels may be generated from one group including 4×8 pixels, or pixel data corresponding to 4×4 pixels may be generated from one group including 16×16 pixels. Furthermore, a binning operation may be performed via other methods according to connection states of pixels.

Figure 11:
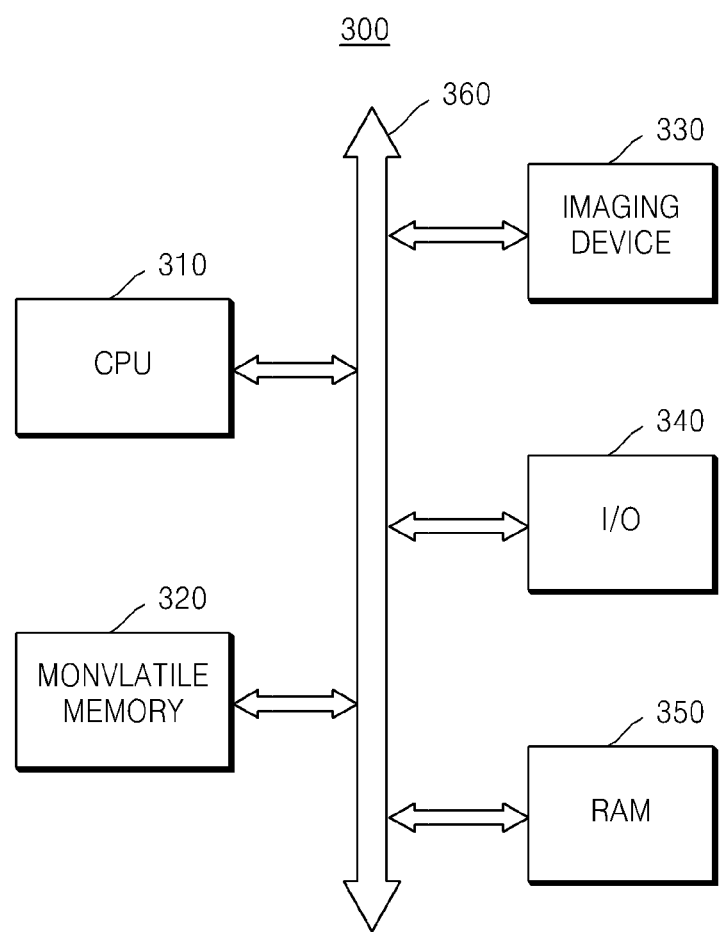
FIG. 11 is a block diagram of a system including an image sensor according to an exemplary embodiment.

FIG. 11 is a block diagram of a system 300 including an image sensor according to an exemplary embodiment. The system 300 of FIG. 11 may include a computer system, a camera system, a scanner, a vehicle navigation system, a mobile phone, a tablet device, a portable device, a security system, a motion detection system, etc., which require image data. Referring to FIG. 11, the system 300 may include a central processing unit (CPU) 310 or a processor, a non-volatile memory 320, an imaging device 330 including an image sensor, an input and output (I/O) device 340, and a random access memory (RAM) 350. The CPU 310 may communicate with the nonvolatile memory 320, the imaging device 330, the I/O device 340, and the RAM 350 through a bus 360.

The imaging device 330 included in the system 300 of FIG. 11 may include the image sensor described above according to one or more exemplary embodiments. For example, the image sensor included in the imaging device 330 may include a pixel array which may include long exposure pixels and short exposure pixels. In addition, the pixel array may include white pixels, which may be arranged according to any one of the patterns described above.

Image data output from the imaging device 330 may be delivered to the CPU 310, the nonvolatile memory 320, the I/O device 340, and the RAM 350 through the bus 360. The imaging device 330 according to an exemplary embodiment may provide an image having a high dynamic range and improved sensing sensitivity.

While not restricted thereto, an exemplary embodiment (e.g., control logic for resetting and sampling pixels, control logic for compensating for white pixels, etc.) can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more elements of the above-described devices can include circuitry, a processor, a microprocessor, etc., and may execute a computer program stored in a computer-readable medium.

While exemplary embodiments have been particularly shown and described above, it will be understood that various changes in form and details may be made therein without departing from the spirit and scope of the following claims.

What is claimed is:

1. A pixel array of an image sensor, the pixel array comprising:
   a plurality of pixel groups, each pixel group comprising:
      one or more long exposure pixels; and
      one or more short exposure pixels,
   wherein each pixel group includes, from among the one or more long exposure pixels and the one or more short exposure pixels, a first pixel having a white component, a second pixel having a first color component, a third pixel having a second color component and a fourth pixel having a third color component, and the white component, the first color component, the second color component and the third color component are different from each other,
   wherein the first pixel belonging to a first pixel group, among the plurality of pixel groups, is a long exposure pixel, and the first pixel belonging to a second pixel group that is adjacent to the first pixel group, among the plurality of pixel groups, is a short exposure pixel,
   wherein the first, second, third and fourth pixels of each pixel group are arranged in a 2×2 matrix of two rows and two columns,
   wherein the plurality of pixel groups are arranged along m rows and n columns, where m and n are integers equal to or greater than 3, and
   wherein the first pixel belonging to a pixel group along a first row and a first column, among the plurality of pixel groups, the first pixel belonging to a pixel group along the first row and a third column, among the plurality of pixel groups, the first pixel belonging to a pixel group along a third row and the first column, among the plurality of pixel groups, and the first pixel belonging to a pixel group along the third row and the third column, among the plurality of pixel groups, are electrically connected to each other in a low resolution mode.

2. The pixel array of claim 1, wherein:
   the second pixel is a red color pixel, the third pixel is a blue color pixel, and the fourth pixel is a green color pixel.

3. The pixel array of claim 1, wherein the second to fourth pixels belonging to the first pixel group are short exposure pixels, and the second to fourth pixels belonging to the second pixel group are long exposure pixels.

4. The pixel array of claim 1, wherein at least one of the second to fourth pixels belonging to the first pixel group is a long exposure pixel, and the at least one of the second to fourth pixels belonging to the second pixel group is a short exposure pixel.

5. The pixel array of claim 1, wherein:
   the second pixel group is adjacent to the first pixel group in a horizontal direction; and
   the first pixel belonging to a third pixel group that is adjacent to the first pixel group in a vertical direction, among the plurality of pixel groups, is a short exposure pixel.

6. The pixel array of claim 1, wherein the first pixels electrically connected to each other are pixels exposed to light for a same length of time.

7. An image sensor comprising:
   a pixel array comprising a plurality of pixel groups, each pixel group comprising:
      one or more long exposure pixels, and
      one or more short exposure pixels; and
   a compensator configured to receive pixel data from the pixel array,
   wherein each pixel group includes, from among the one or more long exposure pixels and the one or more short exposure pixels, a first pixel having a white component;
   wherein the compensator is further configured to compensate for the first pixel by using pixel data received from one or more pixels having color components and a same exposure time as the first pixel,
   wherein the plurality of pixel groups are arranged along m rows and n columns, where m and n are integers equal to or greater than 3, and
   wherein the first pixel belonging to a pixel group along a first row and a first column, among the plurality of pixel groups, the first pixel belonging to a pixel group along the first row and a third column, among the plurality of pixel groups, the first pixel belonging to a pixel group along a third row and the first column, among the plurality of pixel groups, and the first pixel belonging to a pixel group along the third row and the third column, among the plurality of pixel groups, are electrically connected to each other in a low resolution mode.

8. The image sensor of claim 7, wherein:
   each of the plurality of pixel groups includes, from among the one or more long exposure pixels and the one or more short exposure pixels, second to fourth pixels having first to third color components;
   the first pixel belonging to a first pixel group, among the plurality of pixel groups, is a long exposure pixel; and
   the first pixel belonging to a second pixel group that is adjacent to the first pixel group, among the plurality of pixel groups, is a short exposure pixel.

9. The image sensor of claim 8, wherein:
   each of the plurality of pixel groups comprises four pixels along two rows and two columns; and
   the second pixel is a red color pixel, the third pixel is a blue color pixel, and the fourth pixel is a green color pixel.

10. The image sensor of claim 7, further comprising a binning mode controller configured to control an electrical connection relationship of pixels included in the pixel array.

11. The image sensor of claim 10, wherein:
   the binning mode controller electrically connects the first pixels included in at least two pixel groups to each other in a low resolution mode; and
   the electrically connected first pixels are pixels exposed to light for a same length of time.

12. The image sensor of claim 7, further comprising a color converter configured to receive pixel data from the compensator and to convert the received pixel data into red, green, and blue (RGB) data.

13. The image sensor of claim 7, wherein first pixels as long exposure pixels having the white component and first pixels as short exposure pixels having the white component are alternately arranged from one pixel group to the next among the plurality of pixel groups.

14. A pixel array of an image sensor, the pixel array comprising:
 a plurality of pixel groups, each pixel group comprising:
  one or more long exposure pixels; and
  one or more short exposure pixels,
 wherein each pixel group includes, from among the one or more long exposure pixels and the one or more short exposure pixels, a first pixel having a white component, a second pixel having a first color component, a third pixel having a second color component and a fourth pixel having a third color component, and the white component, the first color component, the second color component and the third color component are different from each other, and
 wherein the first, second, third and fourth pixels of each pixel group are arranged in a 2×2 matrix of two rows and two columns,
 wherein the plurality of pixel groups are arranged along m rows and n columns, where m and n are integers equal to or greater than 2; and
 wherein the first pixel belonging to a pixel group along a first row and a first column, among the plurality of pixel groups, and the first pixel belonging to a pixel group along a second row and a second column, among the plurality of pixel groups, are electrically connected to each other in a low resolution mode.

15. The pixel array of claim 14, wherein the first pixel belonging to a first pixel group, among the plurality of pixel groups, is a long exposure pixel, and the first pixel belonging to a second pixel group that is adjacent to the first pixel group, among the plurality of pixel groups, is a short exposure pixel.

16. The pixel array of claim 14, wherein in each pixel group, the first pixel is a long exposure pixel and the second, third and fourth pixels are short exposure pixels, or the first pixel is a short exposure pixel and the second, third and fourth pixels are long exposure pixels.

17. The pixel array of claim 14, wherein the second pixel belonging to a first pixel group, among the plurality of pixel groups, is a short exposure pixel, and the second pixel belonging to a second pixel group that is adjacent to the first pixel group, among the plurality of pixel groups, is a long exposure pixel.

18. The pixel array of claim 17, wherein:
 in a first pixel group among the plurality of pixel groups, the first pixel is a long exposure pixel and the second, third and fourth pixels are short exposure pixels,
 in a second pixel group among the plurality of pixel groups, the first pixel is short exposure pixel and the second, third and fourth pixels are long exposure pixels, and
 the second pixel group is adjacent to the first pixel group.

* * * * *